United States Patent
Tiede et al.

(10) Patent No.: US 10,391,598 B2
(45) Date of Patent: Aug. 27, 2019

(54) HAND-HELD POWER-TOOL DEVICE

(71) Applicant: Robert Bosch GmbH, Stuttgart (DE)

(72) Inventors: Steffen Tiede, Herrenberg (DE);
Michael Weiss, Stuttgart (DE); Juergen Dietel, Stuttgart (DE); Erwin Orendi, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 703 days.

(21) Appl. No.: 14/938,644

(22) Filed: Nov. 11, 2015

(65) Prior Publication Data

US 2016/0129540 A1 May 12, 2016

(30) Foreign Application Priority Data

Nov. 12, 2014 (DE) ......................... 10 2014 223 043

(51) Int. Cl.
*B23Q 11/00* (2006.01)
*B25F 5/02* (2006.01)
*B23Q 1/00* (2006.01)

(52) U.S. Cl.
CPC ........ *B23Q 11/0046* (2013.01); *B23Q 1/0009* (2013.01); *B25F 5/02* (2013.01)

(58) Field of Classification Search
CPC ............ B23Q 11/0042; B23Q 11/0046; B23Q 11/005; B23Q 11/0053; B23Q 11/0057; B23Q 11/006; B23Q 11/0064; B23Q 11/0067; B23Q 11/0071; B23Q 11/0075
USPC ......... 173/58–80, 197, 198, 199; 408/67, 76
See application file for complete search history.

(56) References Cited

U.S. PATENT DOCUMENTS

| | | | | | |
|---|---|---|---|---|---|
| 3,850,254 | A | * | 11/1974 | Hirdes | B23Q 11/0046 408/67 |
| 5,113,951 | A | * | 5/1992 | Houben | B25D 11/005 173/75 |
| 5,199,501 | A | * | 4/1993 | Kluber | B23Q 11/0046 173/198 |
| 6,543,549 | B1 | * | 4/2003 | Riedl | B25B 21/00 173/DIG. 2 |
| 6,615,930 | B2 | * | 9/2003 | Bongers-Ambrosius | B08B 15/04 173/198 |
| 6,851,898 | B2 | * | 2/2005 | Ege | B23Q 11/0046 408/67 |
| 7,017,680 | B2 | * | 3/2006 | Arich | B23Q 1/0009 173/198 |
| 7,182,150 | B2 | * | 2/2007 | Grossman | B23Q 1/0009 173/198 |

(Continued)

FOREIGN PATENT DOCUMENTS

| | | |
|---|---|---|
| CN | 1264926 A | 8/2000 |
| CN | 101573203 A | 11/2009 |

(Continued)

*Primary Examiner* — Jason Daniel Prone
(74) *Attorney, Agent, or Firm* — Maginot, Moore & Beck LLP

(57) ABSTRACT

A hand-held power-tool device includes at least one coupling device, which has at least one contact receiving region, and which is configured to couple an optional additional module to at least one energy supply unit, in at least one operating state. The at least one contact receiving region has (i) at least one receiving opening configured to receive a corresponding contact element of the optional additional module, and (ii) at least one dirt removal opening.

17 Claims, 7 Drawing Sheets

(56) References Cited

U.S. PATENT DOCUMENTS

| | | | |
|---|---|---|---|
| 7,354,226 B2 * | 4/2008 | Britz | B23Q 11/0046 173/198 |
| 7,425,109 B2 * | 9/2008 | Simm | B23Q 11/0046 173/198 |
| 7,909,114 B2 * | 3/2011 | Nishikawa | B23Q 11/0046 173/198 |
| 8,424,615 B2 * | 4/2013 | Baumann | B25F 5/021 173/31 |
| 8,834,641 B2 * | 9/2014 | Baker | B08B 15/04 408/67 |
| 8,915,309 B2 * | 12/2014 | Kakiuchi | B23Q 11/0046 173/198 |
| 9,056,379 B2 * | 6/2015 | Yoshikane | B23Q 11/0046 |
| 9,114,491 B2 * | 8/2015 | Kakiuchi | B23Q 11/0046 |
| D741,557 S * | 10/2015 | Young | D32/18 |
| D742,081 S * | 10/2015 | Young | D32/18 |
| 9,505,095 B2 * | 11/2016 | Machida | B23Q 11/0046 |
| 9,656,361 B2 * | 5/2017 | Appel | A47L 7/0095 |
| 9,776,296 B2 * | 10/2017 | Brewster | B23Q 11/00 |
| 9,943,940 B2 * | 4/2018 | Furusawa | B23Q 11/0046 |
| 2002/0154960 A1 * | 10/2002 | Lin | B23Q 11/0046 408/67 |
| 2006/0237207 A1 | 10/2006 | Britz et al. | |
| 2009/0091277 A1 * | 4/2009 | Ontl | B25F 5/00 318/139 |
| 2017/0057037 A1 * | 3/2017 | Lauer | B23Q 11/0071 |
| 2017/0087707 A1 * | 3/2017 | Appel | B23B 47/34 |
| 2017/0173775 A1 * | 6/2017 | Ullrich | B25D 17/20 |
| 2017/0232565 A1 * | 8/2017 | Machida | B23Q 11/0071 173/198 |
| 2018/0021905 A1 * | 1/2018 | Furusawa | B23B 47/34 451/453 |

FOREIGN PATENT DOCUMENTS

| | | | | |
|---|---|---|---|---|
| CN | 103128719 A | 6/2013 | | |
| DE | 102014223043 A1 * | 5/2016 | | B23Q 11/0046 |
| GB | 2484205 A | 4/2012 | | |
| JP | WO 2015147015 A1 * | 10/2015 | | B25F 5/006 |

* cited by examiner

HAND-HELD POWER-TOOL DEVICE

This application claims priority under 35 U.S.C. § 119 to patent application no. DE 10 2014 223 043.8, filed on Nov. 12, 2014 in Germany, the disclosure of which is incorporated herein by reference in its entirety.

BACKGROUND

There has already been proposed a hand-held power-tool device, having at least one coupling device, which has at least one contact receiving region, and which is provided to couple an optional additional module to at least one energy supply unit, in at least one operating state.

SUMMARY

The disclosure is based on a hand-held power-tool device, having at least one coupling device, which has at least one contact receiving region, and which is provided to couple an optional additional module to at least one energy supply unit, in at least one operating state.

It is proposed that the at least one contact receiving region have at least one receiving opening for receiving a corresponding contact element of the optional additional module, and at least one dirt removal opening. Preferably, the optional additional module does not have its own energy supply. Particularly preferably, the optional additional module does not have its own internal energy supply. In principle, however, it would also be conceivable for the optional additional module to have an optional power pack. A "hand-held power-tool device" in this context is to be understood to mean, in particular, a device that constitutes at least a part of a hand-held power tool or for a hand-held power tool, in particular is provided for mounting on a hand-held power tool. A "hand-held power tool" in this case is to be understood to mean, in particular, a machine for performing work on a workpiece, but advantageously a drill, a rotary hammer and/or percussion hammer, a saw, a planer, a screwdriver, a router, a sander, an angle grinder, a garden appliance and/or a multifunction tool. In addition, in this context, a "coupling device" is to be understood to mean, in particular, a device provided to couple an optional additional module to at least one energy supply unit, in at least one operating state. Preferably, this is to be understood to mean, in particular, a device provided at least to electrically couple an optional additional module to at least one energy supply unit. Particularly preferably, this is to be understood to mean a device via which the hand-held power-tool device can be coupled to a corresponding coupling device of the optional additional module. Furthermore, in this context, a "contact receiving region" is to be understood to mean, in particular, a receiving region provided to receive a contact element of a corresponding coupling device of an optional additional module. Preferably, this is to be understood to mean, in particular, a receiving region in which the corresponding contact element is received when the optional additional module is in a coupled state. Particularly preferably, this is to be understood to mean, in particular, a receiving region in which at least one contact element of the hand-held power-tool device is arranged, at least partially, for the purpose of effecting contacting to the corresponding contact element. An "optional additional module" in this context is to be understood to mean, in particular, a module such as, for example, an assembly and/or a device, that can be optionally coupled to the hand-held power-tool device and/or to a hand-held power tool having the hand-held power-tool device. Preferably, this is to be understood to mean, in particular, a module provided to provide an additional function when in a coupled state, but which is not relevant to a fundamental function of the hand-held power-tool device and/or to a hand-held power tool having the hand-held power-tool device. Various optional additional modules, considered appropriate by persons skilled in the art, are conceivable, but these are to be understood to be, in particular, an optional suction extraction system. Particularly preferably, these are to be understood to be, in particular, a partially autonomous suction extraction system that has to be coupled to the hand-held power-tool device only for the purpose of energy supply. Moreover, it would be conceivable for control of the suction extraction system to be additionally effected via the hand-held power-tool device, such as, for example, switching on and off of the suction extraction system. In addition, an "energy supply unit" is to be understood here to mean, in particular, a unit provided to provide energy. Preferably, this is to be understood to mean, in particular, a unit provided at least to provide energy for the hand-held power tool. Various energy supply units, considered appropriate by persons skilled in the art, are conceivable, such as a power pack, a mains power connection, a solar element and/or a fuel cell. Particularly preferably, however, this is to be understood to mean a battery. "Provided" is to be understood to mean, in particular, specially designed and/or specially equipped. That an object is provided for a particular function, is to be understood to mean, in particular, that the object fulfills and/or executes this particular function in at least one application state and/or operating state. Furthermore, a "receiving opening" in this context is to be understood to mean, in particular, an opening provided to receive a corresponding contact element of the optional additional module. Preferably, this is to be understood to be, in particular, an opening via which the corresponding contact element is introduced into the contact receiving region. Preferably, this is to be understood to be, in particular, an opening via which the corresponding contact element is inserted in the coupling device during a joining operation. Particularly preferably, this is to be understood to be, in particular, an opening via which the corresponding contact element projects into the contact receiving region when in a coupled state. A "dirt removal opening" in this context is to be understood to mean, in particular, an opening via which dirt can pass, in particular can fall, directly out of the contact receiving region. Preferably, this is to be understood to be, in particular, an opening via which dirt can pass, in particular can fall, directly out of the contact receiving region even when the optional additional module is in a coupled state. Particularly preferably, this is to be understood to mean, in particular, an outwardly directed opening, via which dirt is pushed out of the contact receiving region in the case of a joining operation.

Advantageously, the design of the hand-held power-tool device according to the disclosure makes it possible to prevent the contact receiving region from becoming clogged by dirt. In addition, removal of dirt can be achieved, advantageously, by simple structural design. This enables reliable contacting to be achieved.

It is additionally proposed that the at least one dirt removal opening be arranged, at least partially, in a sub-region of the contact receiving region that differs from a sub-region in which the at least one receiving opening is arranged. Preferably, the dirt removal opening is arranged, at least partially, in a sub-region of the contact receiving region located on an opposite side of the contact receiving region in respect of a sub-region in which the receiving opening is arranged. In the case of a notional division of the contact receiving region into two sub-regions of approximately equal size, which are divided by a plane perpendicular to a direction of main extent of the contact receiving region, the dirt removal opening is preferably arranged, at least partially, in a sub-region of the contact receiving region in which the receiving opening is not arranged. Particularly preferably, the dirt removal opening is open in a direction that is different from that of the receiving opening. A coupled optional additional module can thereby be reliably prevented from impeding removal of dirt, or impeding dirt from falling out of the contact receiving region. In particular, reliable removal dirt can thus be achieved. Furthermore, advantageously, removal of dirt can be achieved by simple structural design.

Furthermore, it is proposed that the at least one dirt removal opening constitute an opening plane that extends at least approximately perpendicularly in relation to an opening plane of the at least one receiving opening. That "the opening plane of the at least one dirt removal opening extends at least approximately perpendicularly in relation to the opening plane of the at least one receiving opening" is to be understood to mean, in particular, that a normal vector of the opening plane of the at least one dirt removal opening have, with a normal vector of the opening plane of the at least one receiving opening, in a point of intersection, a least angle of 90°, with a maximum deviation of, in particular, less than 8°, advantageously less than 5°, and particularly advantageously less than 2° in relation to each other. An "opening plane" in this context is to be understood to mean, in particular, a plane of main extent of an opening. Preferably, this is to be understood to mean, in particular, a plane with which the opening is open outwardly. A "plane of main extent" of an opening in this case is to be understood to mean, in particular, a plane that extends parallelwise in relation to a greatest lateral face of a smallest geometric cuboid that only just completely encloses the opening and that, in particular, goes through the mid-point of the cuboid. A coupled optional additional module can thereby be reliably prevented from impeding removal of dirt, or impeding dirt from falling out of the contact receiving region. In particular, reliable removal dirt can thus be achieved.

It is additionally proposed that the at least one dirt removal opening directly adjoin the at least one receiving opening. Preferably, the dirt removal opening is connected to the receiving opening. Particularly preferably, the two openings constitute a common opening. That the dirt removal opening directly adjoins the receiving opening" is to be understood to mean, in this context, that the openings are directly connected to each other. Preferably, this is to be understood to mean, in particular, that a connecting region between the openings is free of material such as, for example, walls. As a result, a hand-held power-tool device of a structurally simple design can be provided. Moreover, in particular, this enables a material requirement to be kept to a small amount. In particular, this enables an advantageous removal of dirt to be achieved.

It is further proposed that the coupling device have at least one contact holder that delimits, at least partially, the at least one contact receiving region, and at least one contact element that projects, at least partially, into the at least one contact receiving region, and at least one latching element, via which the at least one contact element is secured to the at least one contact holder. Preferably, the contact receiving region is defined, at least partially, by the contact holder. Particularly preferably, the contact holder surrounds the at least one contact receiving region, at least partially. A "contact holder" in this context is to be understood to mean, in particular, an element provided to delimit the at least one contact receiving region, at least partially. Preferably, this is to be understood to mean, in particular, an element provided to at least partially receive a contact element. Particularly preferably, the at least one contact element is fastened to the contact holder and, by means of the latter, is aligned relative to the at least one contact receiving region. In addition, a "contact element" in this context is to be understood to mean, in particular, an element provided for effecting contacting to a corresponding contact element of the optional additional module, in at least one operating state. Preferably, this is to be understood to mean, in particular, an electrical contact for making an electrical connection. A "latching element" in this context is to be understood to mean, in particular, an element for making a latching connection, which element, in the case of a fastening operation, is elastically deflected in order subsequently to latch-in behind a corresponding latching element as a result of an inner clamping force. As a result, in particular, an advantageous coupling device can be provided. In particular, assembly can be effected in a rapid and simple manner. In addition, the at least one contact element can be aligned in a reliable manner in the at least one contact receiving region. This enables reliable contacting to be achieved.

It is additionally proposed that the coupling device have at least one contact element that projects, at least partially, into the at least one contact receiving region, and that is realized as an electrical contact element. Preferably, the at least one contact element of the coupling device is the previously mentioned contact element. In principle, however, it would also be conceivable for it to be an alternative or further contact element. In particular, a reliable transmission of energy from the energy supply unit to the optional additional module can be achieved as a result. An electrical connection can be made in a reliable manner. Moreover, a reliable signal transmission can also be achieved.

Furthermore, it is proposed that the at least one coupling device have at least two contact elements connected to the at least one energy supply unit, which are arranged in an offset manner in relation to each other in a direction parallel to a direction of main extent of the contact elements. Preferably, the contact elements are realized as electrical contact elements. Preferably, the at least two contact elements of the coupling device are the previously mentioned contact element. In principle, however, it would also be conceivable for it to be an alternative or further contact element. A "direction of main extent" of a structural unit in this context is to be understood to mean, in particular, a direction that extends parallelwise in relation to a longest lateral edge of a smallest geometric cuboid that only just completely encloses the structural unit. Advantageously, in the case of an operation to join corresponding contact elements of the optional additional module, an insertion force can be kept small.

The disclosure is additionally based on a hand-held power tool having a hand-held power-tool device. It is proposed that the hand-held power tool have a housing, having at least one recess, via which the at least one contact receiving region is open outwardly. Preferably, the hand-held power-tool device is integrated into the housing. Preferably, each contact receiving region of the hand-held power-tool device has an associated recess in the housing. In principle, it would also be conceivable for the hand-held power-tool device to be integrated into a battery. "Open outwardly" in this context is to be understood to mean, in particular, that the contact receiving region is open toward surroundings of the hand-held power tool. In addition, in this context, "integrated" is to be understood to mean, in particular, that the hand-held power-tool device is arranged at least partially within an outer contour of the housing. Preferably, this is to be understood to mean, in particular, that the hand-held power-tool device is at least partially surrounded by the housing. As a result, in particular, an advantageously compact hand-held power tool can be provided. In addition, an advantageously simple and rapid coupling of the optional additional module can be achieved as a result.

It is further proposed that a labyrinth be realized in a transition region between the housing and at least one contact holder of the hand-held power-tool device. A "labyrinth" in this context is to be understood to mean, in particular, a connecting transition between two components, at which a geometry of the components in the connecting transition is realized in such a manner that a gap between the components is of a length that is at least 2 times, preferably 3 times, and particularly preferably 5 times a minimally possible gap length. Preferably, this is to be understood to mean, in particular, a connecting transition between two components that is realized as a labyrinth seal. Dust from the contact receiving region can thereby be reliably prevented from penetrating an interior of the hand-held power tool. Preferably, sealing between the contact holder and the housing can be achieved thus by simple structural design.

Furthermore, the disclosure is based on a system, having at least one additional module and having at least one hand-held power tool. It is proposed that the at least one additional module have at least one contact element and, parallel thereto, at least one guide extension, which is provided to pre-center the at least one contact element in the case of a joining operation. Preferably, the guide extension is provided to pre-center the at least one contact element, in the case of a joining operation between the additional module and the hand-held power tool, or hand-held power-tool device. A "guide extension" in this context is to be understood to mean, in particular, a web-shaped extension that extends parallelwise in relation to the contact element of the additional module, and that is provided to pre-center the at least one contact element.

Preferably, this is to be understood to mean, in particular, an extension provided, in the case of a joining operation, to be introduced together with the contact element into the contact receiving region, and to pre-center the contact element of the additional module before contacting of the contact element of the additional module with a contact element of the hand-held power-tool device. This enables reliable contacting to be achieved between the contact element of the additional module and the contact element of the hand-held power-tool device.

The hand-held power-tool device according to the disclosure and the hand-held power tool according to the disclosure are not intended in this case to be limited to the application and embodiment described above. In particular, the hand-held power-tool device according to the disclosure and the hand-held power tool, and the system, may have individual elements, components and units that differ in number from a number stated herein, in order to fulfill a principle of function described herein.

BRIEF DESCRIPTION OF THE DRAWINGS

Further advantages are disclosed by the following description of the drawing. The drawing shows two exemplary embodiments of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
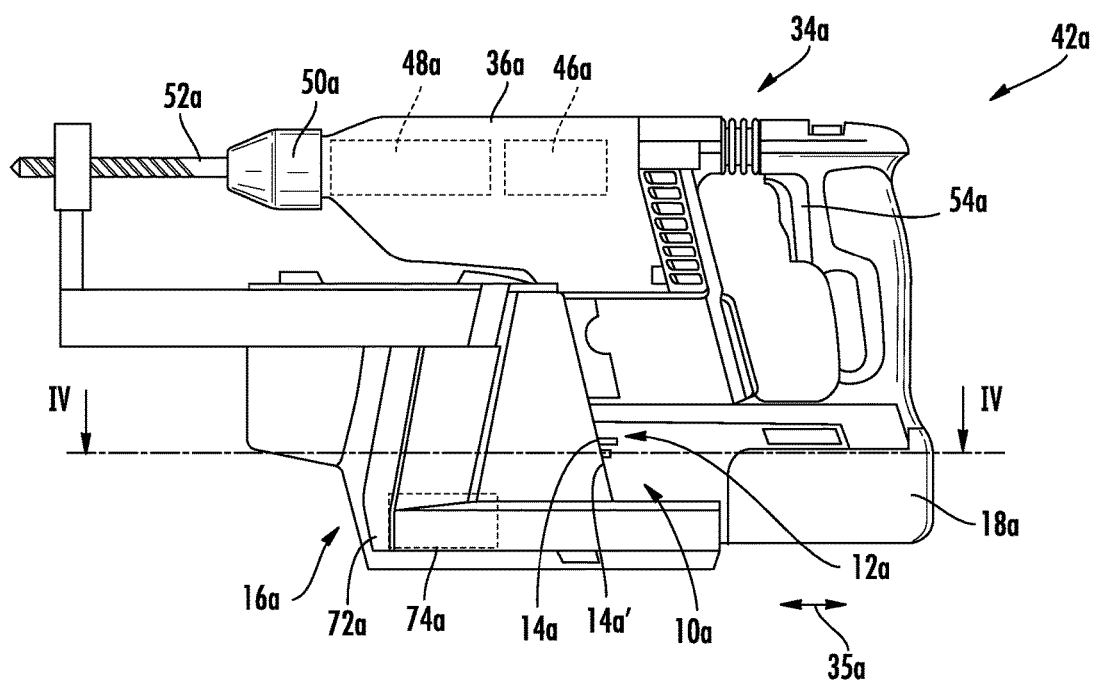
FIG. 1 a system, having an additional module, and having a hand-held power tool that has a hand-held power-tool device according to the disclosure, in a schematic representation, FIG. 2 the hand-held power tool having the hand-held power-tool device according to the disclosure, in a schematic representation, FIG. 3 a portion of the hand-held power tool having the hand-held power-tool device according to the disclosure, in a schematic sectional representation along the section line III-III, FIG. 4 a portion of the system, having the additional module, and having the hand-held power tool that has the hand-held power-tool device according to the disclosure, in a schematic sectional representation along the section line IV-IV, FIG. 5 a portion of the system, having the additional module, and having the hand-held power tool that has the hand-held power-tool device according to the disclosure, in a schematic sectional representation along the section line V-V, FIG. 6 the hand-held power-tool device, having with a coupling device that has three contact receiving regions, in a schematic representation, and FIG. 7 a hand-held power tool, having with an energy supply unit, and having with an alternative hand-held power-tool device according to the disclosure, in a schematic representation.
Figure 2:
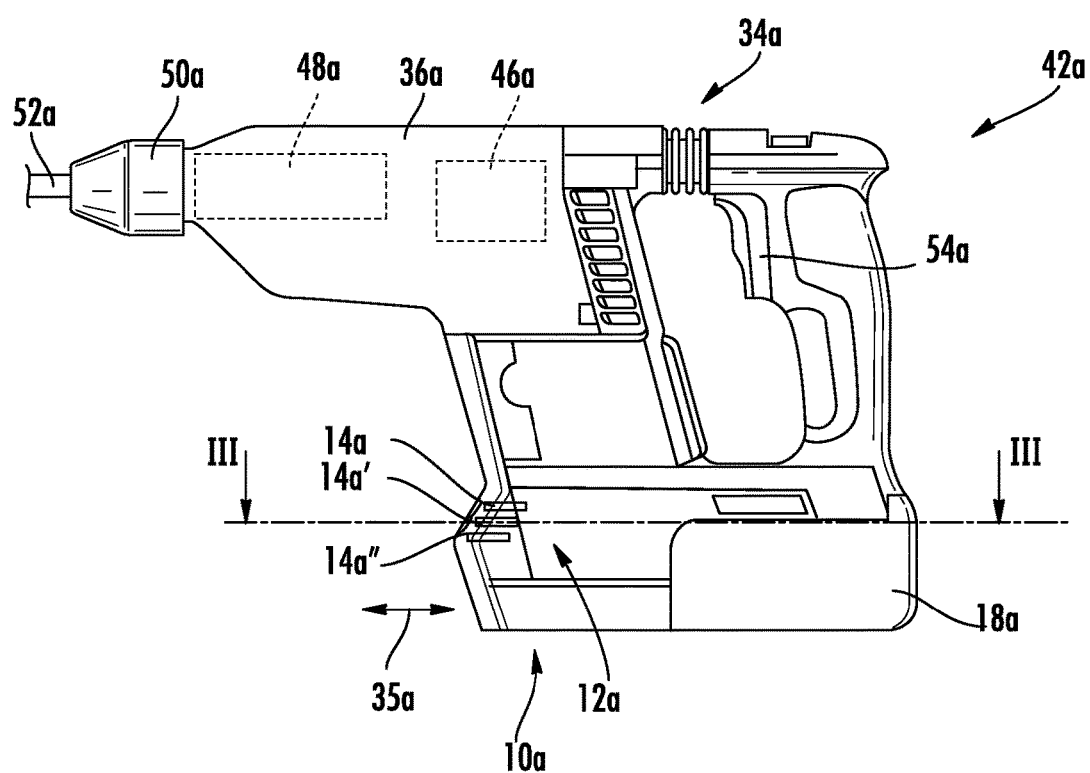

FIG. 1 shows a system 42a having an additional module 16a and having a hand-held power tool 34a. The hand-held power tool 34a is realized as a rotary hammer. In principle, however, another design of the hand-held power tool 34a, considered appropriate by persons skilled in the art, would also be conceivable, such as, for example, as a saw, planer, screwdriver, router, sander, angle grinder, garden appliance and/or multifunction tool. The hand-held power tool 34a has a drive unit 46a, a percussion mechanism unit 48a and a housing 36a. In addition, the hand-held power tool 34a has a tool holder 50a, in which a tool 52a is held. The drive unit 46a comprises a motor, not further visible, and a transmission unit, not further visible. By means of the motor and the transmission unit, the tool holder 50a is driven in rotation when the hand-held power tool 34a is in a state of operation. In addition, the percussion mechanism unit 48a is driven by means of the motor and the transmission unit. Furthermore, the hand-held power tool 34a has an energy supply unit 18a. During operation, the drive unit 46a is supplied with energy by means of the energy supply unit 18a. The energy supply unit 18a is realized as a battery device. The energy supply unit 18a is realized as a battery. The hand-held power tool additionally has an operating switch 54a. Via the operating switch 54a, an operator can control a supply of energy to the drive unit 46a by the energy supply unit 18a.

The hand-held power tool 34a additionally has a hand-held power-tool device 10a. The hand-held power-tool device 10a has a coupling device 12a. The coupling device 12a is provided to couple the additional module 16a to the energy supply unit 18a when in a state of operation. The additional module 16a is optional. The additional module 16a need not be coupled to the coupling device 12a for operation of the hand-held power tool 34*a*. By means of the coupling device 12*a*, the additional module 16*a* can be supplied with energy of the energy supply unit 18*a* of the hand-held power tool 34*a*. The additional module 16*a* does not require any additional energy supply. A supply of energy to the coupling device 12*a* by the energy supply unit 18*a* is controlled via of the operating switch 54*a*, via which a supply of energy to the drive unit 46*a* by the energy supply unit 18*a* can also be controlled. With the activation of the drive unit 46*a* of the hand-held power tool 34*a*, when the additional module 16*a* is in a coupled state, the additional module 16*a* becomes activated at the same time. In principle, however, another control of the coupling device 12*a*, considered appropriate by persons skilled in the art, would also be conceivable.

The coupling device 12*a* has a contact holder 30*a*. The contact holder 30*a* is arranged in the housing 36*a* of the hand-held power tool 34*a*. The contact holder 30*a* is fastened within the housing 36*a* of the hand-held power tool 34*a*, and is not further visible. A labyrinth 40*a* is realized in a transition region between the housing 36*a* and the contact holder 30*a* of the hand-held power-tool device 10*a*. This is intended to prevent penetration by dust. The contact holder 30*a* is provided to receive contact elements 32*a*, 32*a'*, 32*a"*.

The coupling device 12*a* has the contact elements 32*a*, 32*a'*, 32*a"*. The coupling device 12*a* has three contact elements 32*a*, 32*a'*, 32*a"*. The contact elements 32*a*, 32*a'*, 32*a"* are fastened to the contact holder 30*a*. The contact elements 32*a*, 32*a'*, 32*a"* each have a latching element 33*a*, 33*a'*, 33*a"*, by means of which the contact elements are secured to the contact holder 30*a*. The contact elements 32*a*, 32*a'*, 32*a"* are realized as electrical contact elements. The contact elements 32*a*, 32*a'*, 32*a"* are realized as clamping contacts. The contact elements 32*a*, 32*a'*, 32*a"* are each composed of a bent metal plate. In principle, however, another design of the contact elements 32*a*, 32*a'*, 32*a"*, considered appropriate by persons skilled in the art, would also be conceivable. The contact elements 32*a*, 32*a'*, 32*a"* each have a clamping region 56*a*, 56*a'*, 56*a"*, a holding region 58*a*, 58*a'*, 58*a"* that adjoins the latter, and a contacting region 60*a*, 60*a'*, 60*a"* that adjoins the holding region 58*a*, 58*a'*, 58*a"*. The clamping region 56*a*, 56*a'*, 56*a"* of the contact elements 32*a*, 32*a'*, 32*a"* is provided to fix a respective cable 62*a*, 64*a*, 66*a*, and for effecting electrical contacting to the corresponding cable 62*a*, 64*a*, 66*a*. A first cable 62*a* is connected to a first contact element 32*a*. A second cable 64*a* is connected to a second contact element 32*a'*. Additionally, a third cable 66*a* is connected to a third contact element 32*a"*. The first cable 62*a* is connected to the energy supply unit 18*a* by an end that faces away from the first contact element 32*a*. The first contact element 32*a* constitutes a voltage-carrying contact. The third cable 66*a* is likewise connected to the energy supply unit 18*a* by an end that faces away from the third contact element 32*a"*. The third contact element 32*a"* constitutes a contact that closes an electric circuit. The second cable 64*a* is connected to the control electronics, not further visible, by an end that faces away from the second contact element 32*a'*. The second contact element 32*a'* constitutes a signal contact. The second contact element 32*a'* is arranged between the first contact element 32*a* and the third contact element 32*a"*. Control of the additional module 16*a* can be effected via the second contact element 32*a'*. Via the second contact element 32*a'*, the control electronics of the hand-held power tool 34*a*, which are not further visible, can be connected to control electronics of the additional module 16*a* that are not further visible. Via the second contact element 32*a'*, the control electronics of the hand-held power tool 34*a*, which are not further visible, can send to the control electronics of the additional module 16*a*, in particular, a signal to activate and/or deactivate a suction extraction system of the additional module 16*a*. A connection of the third contact element 32*a"* to the energy supply unit 18*a* is opened or closed in dependence on the signal contact and in dependence on a position of the operating switch 54*a*.

The holding region 58*a*, 58*a'*, 58*a"* of the contact elements 32*a*, 32*a'*, 32*a"* is provided to secure the respective contact element 32*a*, 32*a'*, 32*a"*. The holding region 58*a*, 58*a'*, 58*a"* comprises the latching element 33*a*, 33*a'*, 33*a"*, which latches with the contact holder 30*a*. The contacting region 60*a*, 60*a'*, 60*a"* of the contact elements 32*a*, 32*a'*, 32*a"* is in each case provided to effect contacting to a corresponding contact element 22*a*, 22*a'*, 22*a"*, respectively, of the additional module 16*a*. When the additional module 16*a* is in a state of having been coupled to the hand-held power tool 34*a*, the corresponding contact elements 22*a*, 22*a'*, 22*a"* contact the contact elements 32*a*, 32*a'*, 32*a"* of the hand-held power-tool device 10*a*, at the contacting regions 60*a*, 60*a'*, 60*a"*, respectively. Via the contacting regions 60*a*, 60*a'*, 60*a"*, the additional module 16*a* is electrically connected to the hand-held power-tool device 10*a* and, via the latter, to the energy supply unit 18*a*. The contacting regions 60*a*, 60*a'*, 60*a"* each have two contact plates, which converge toward one another in the shape of a bird's bill, to a point of contact, in a direction going away from the associated clamping region 56*a*, 56*a'*, 56*a"*. The contact plates then diverge again, in a direction going away from the associated clamping region 56*a*, 56*a'*, 56*a"*, in order to form an insertion funnel for a corresponding contact element 22*a*, 22*a'*, 22*a"*.

The coupling device 12*a* additionally has a plurality of contact receiving regions 14*a*, 14*a'*, 14*a"*. The coupling device 12*a* has three contact receiving regions 14*a*, 14*a'*, 14*a"*. The contact receiving regions 14*a*, 14*a'*, 14*a"* are each provided to receive one of the corresponding contact elements 22*a*, 22*a'*, 22*a"* of the additional module 16*a* when the additional module 16*a* is in a coupled state. The contact receiving regions 14*a*, 14*a'*, 14*a"* are each constituted by delimited receiving regions, in which the corresponding contact elements 22*a*, 22*a'*, 22*a"* of the additional module 16*a* engage. The contact receiving regions 14*a*, 14*a'*, 14*a"* are constituted by approximately cuboid regions that are arranged next to each other. The contact receiving regions 14*a*, 14*a'*, 14*a"* are partially delimited by the contact holder 30*a*. The contact holder 30*a* delimits the contact receiving regions 14*a*, 14*a'*, 14*a"* partially. For this purpose, the contact holder 30*a* has walls 68*a* that project out of a base body 70*a* of the contact holder 30*a*, and that partially delimit the contact receiving regions 14*a*, 14*a'*, 14*a"* and separate them from each other. The walls 68*a* are parallel to each other. Each of the contact receiving regions 14*a*, 14*a'*, 14*a"* is directly delimited by two opposite walls 68*a*. The contact elements 32*a*, 32*a'*, 32*a"* project into one of the contact receiving regions 14*a*, 14*a'*, 14*a"*, respectively. For this purpose, the contact elements 32*a*, 32*a'*, 32*a"* are held and latched, by means of the holding region 58*a*, 58*a'*, 58*a"*, between the opposing walls 68*a* that delimit the respective contact receiving region 14*a*, 14*a'*, 14*a"*. To ensure electrical safety, the contact elements 32*a*, 32*a'*, 32*a"* are arranged with an inward offset in relation to the housing 36*a*.

In addition, a wall 78*a*, 78*a'*, 78*a"* that extends transversely in relation to a direction of main extent 35*a* of the contact elements 32*a*, 32*a'*, 32*a"* is in each case arranged in a region of the holding region 58*a*, 58*a'*, 58*a"* of the contact elements 32a, 32a', 32a". The walls 78a, 78a', 78a" are each arranged at a rear end of the respective contact receiving region 14a, 14a', 14a". The walls 78a, 78a', 78a" each directly adjoin the respective holding region 58a, 58a', 58a" of the contact elements 32a, 32a', 32a". The walls 78a, 78a', 78a" are integral with the contact holder 30a. In principle, however, it would also be conceivable for the walls 78a, 78a', 78a" to be formed on to the contact elements 32a, 32a', 32a" in each case. The walls 78a, 78a', 78a" are provided to prevent penetration by dirt and dust. The walls 78a, 78a', 78a" are each rounded off toward the respective contact receiving region 14a, 14a', 14a" and toward the base body 70a of the contact holder 30a. Advantageously, this enables the dirt to be guided in the direction of the dirt removal openings 24a'.

The housing 36a of the hand-held power tool 10a has three recesses 38, 38a', 38a", which correspond to the contact receiving regions 14a, 14a', 14a" and via which the contact receiving regions 14a, 14a', 14a" are open outwardly. The contact receiving regions 14a, 14a', 14a" each have a receiving opening 20a, 20a', 20a". The contact receiving regions 14a, 14a', 14a" are each open outwardly, inter alia, by the receiving opening 20a, 20a', 20a". The receiving openings 20a, 20a', 20a" are each provided to receive one of the corresponding contact elements 22a, 22a', 22a" of the optional additional module 16a. Via the receiving openings 20a, 20a', 20a", the corresponding contact elements 22a, 22a', 22a" are brought into the contact receiving regions 14a, 14a', 14a" during a joining operation between the additional module 16a and the hand-held power tool 34a, or the hand-held power-tool device 10a.

Figure 3:
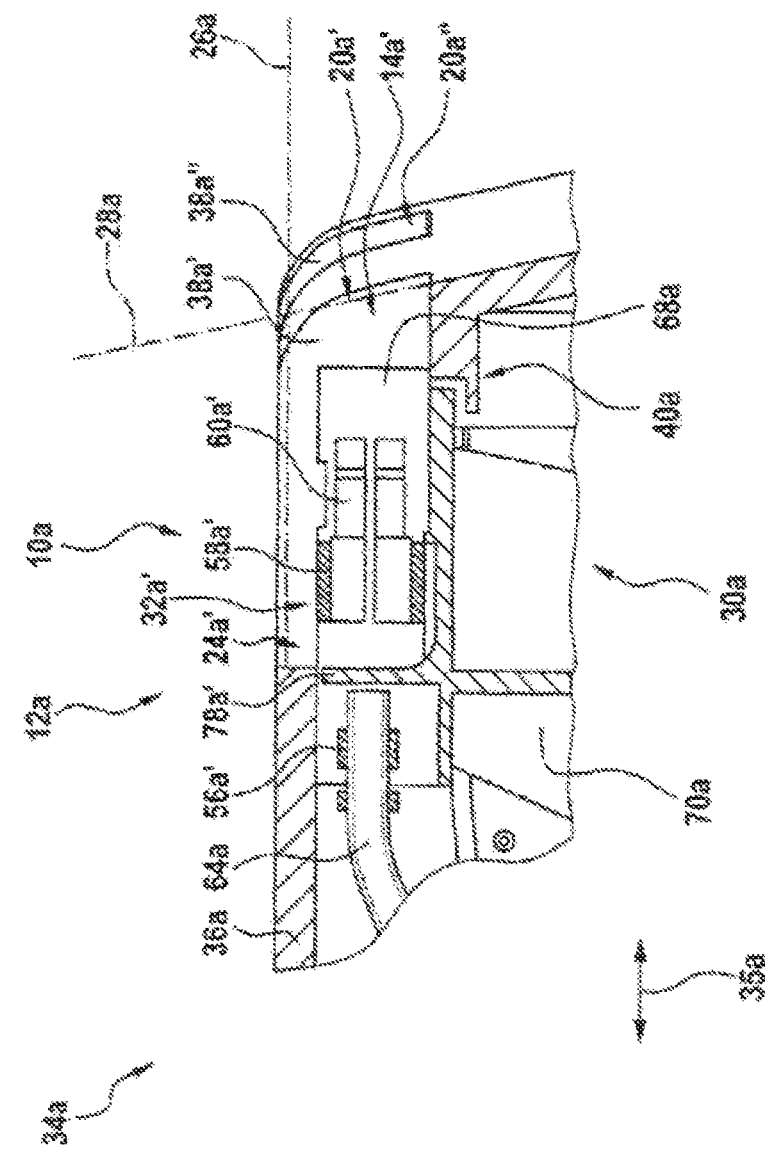
Figure 4:
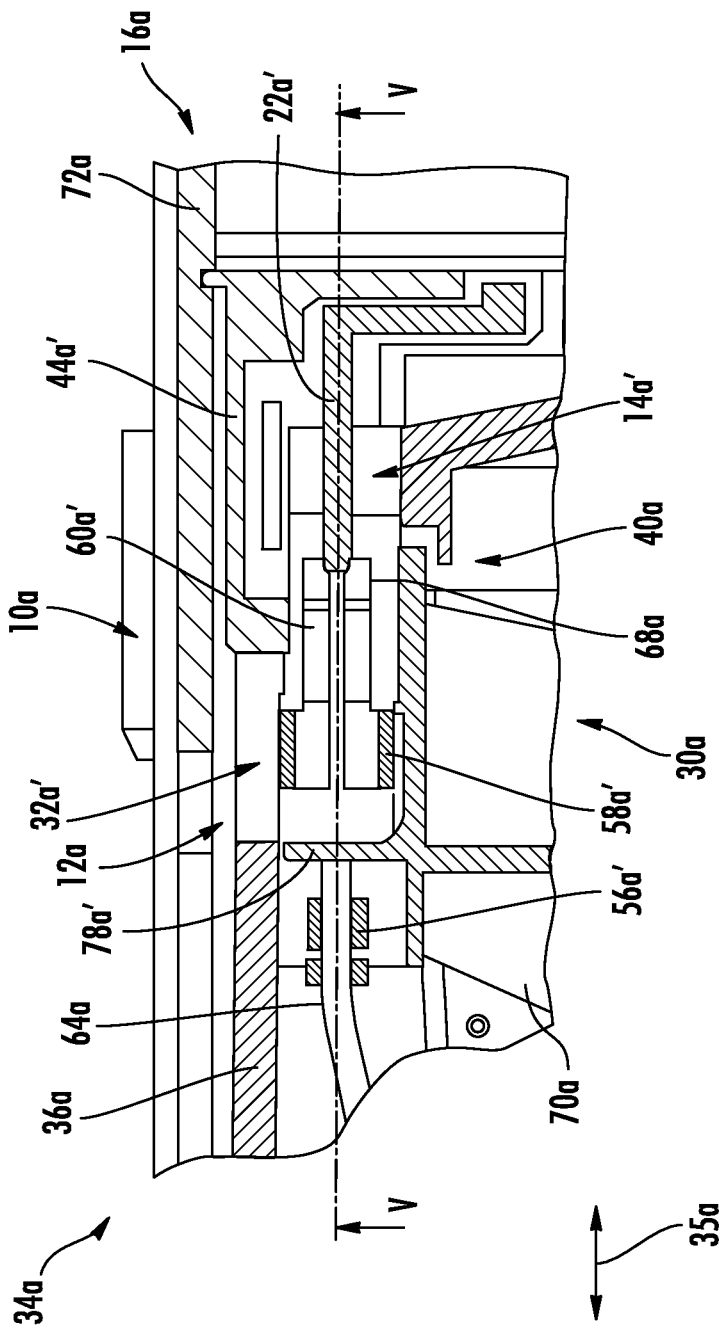
Figure 5:
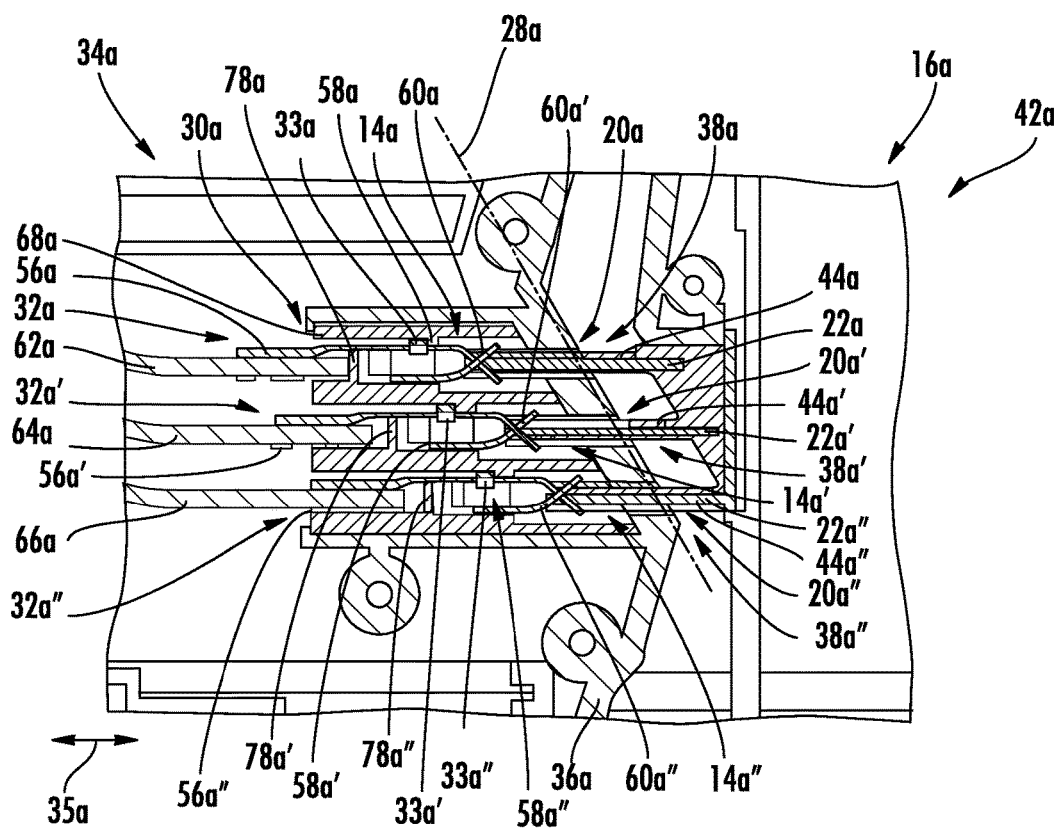
Figure 6:
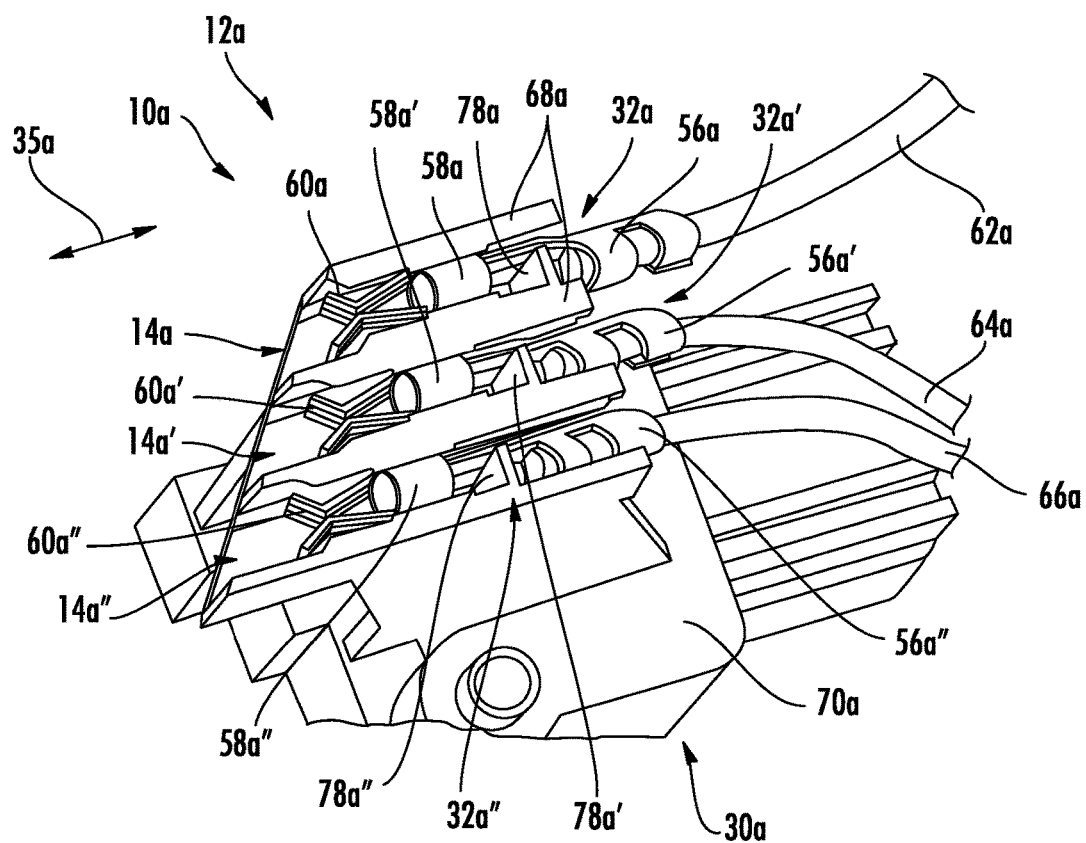

In addition, the contact receiving regions 14a, 14a', 14a" each have a dirt removal opening 24a'. The contact receiving regions 14a, 14a', 14a" are each likewise open outwardly by the dirt removal opening 24a'. Via the dirt removal openings 24a', dirt and dust can fall out of the contact receiving regions 14a, 14a', 14a", even when the additional module 16a has been coupled to the hand-held power-tool device 10a. For this purpose, the dirt removal openings 24a' are each arranged partially in a sub-region of the respectively associated contact receiving region 14a, 14a', 14a", which differs from a sub-region in which the receiving opening 20a, 20a', 20a" of the same contact receiving region 14a, 14a', 14a" is arranged. The dirt removal openings 24a' are each arranged partially on a side of the respective contact receiving region 14a, 14a', 14a" that is different from that of the receiving opening 20a, 20a', 20a" of the same contact receiving region 14a, 14a', 14a". The dirt removal openings 24a' are each open in a direction that differs from that of the receiving opening 20a, 20a', 20a" of the same contact receiving region 14a, 14a', 14a". The dirt removal openings 24a' each form an opening plane 26a, which extends approximately perpendicularly in relation to an opening plane 28a of the receiving opening 20a, 20a', 20a" of the same contact receiving region 14a, 14a', 14a". The opening plane 26a of the dirt removal openings 24a' encloses an angle of approximately 80° with the opening plane 28a of the receiving opening 20a, 20a', 20a". The receiving openings 20a, 20a', 20a" have a common opening plane 28a. The dirt removal openings 24a' have a common opening plane 26a. The common opening plane 26a depicted in FIG. 3 is shown slightly offset from the dirt removal openings 24a' for clarity. The dirt removal openings 24a' each directly adjoin the receiving opening 20a, 20a', 20a" of the same contact receiving region 14a, 14a', 14a". The dirt removal openings 24a' are each connected to the receiving opening 20a, 20a', 20a" of the same contact receiving region 14a, 14a', 14a".

The dirt removal opening 24a' and the receiving opening 20a, 20a', 20a" of the same contact receiving region 14a, 14a', 14a" form a common opening in each case.

The additional module 16a is realized as a dust suction module. In principle, however, another design of the additional module 16a, considered appropriate by persons skilled in the art, would also be conceivable. The additional module 16a can be latched together with the hand-held power tool 34a, this not being further visible. The additional module 16a has a housing 72a. In addition, the additional module 16a has an electrical suction unit 74a, via which dust and dirt can be sucked from the tool 52a into a collecting container, not further visible. The collecting container is arranged inside the housing 72a. In principle, however, an external collecting container would also be conceivable.

The additional module 16a additionally has the three corresponding contact elements 22a, 22a', 22a". The three corresponding contact elements 22a, 22a', 22a" are provided to effect contacting to the contact elements 32a, 32a', 32a" of the coupling device 12a. The three corresponding contact elements 22a, 22a', 22a" are embedded in a contact holder, not further visible, of the additional module 16a. Furthermore, the additional module 16a has three guide extensions 44a, 44a', 44a", which are parallel to the contact elements 22a, 22a', 22a". The guide extensions 44a, 44a', 44a" form a part of the contact holder, not further visible, of the additional module 16a. The guide extensions 44a, 44a', 44a" are constituted by webs that are integral with the housing 72a. The guide extensions 44a, 44a', 44a" are provided to pre-center the contact elements 22a, 22a', 22a" in the case of a joining operation between the additional module 16a and the hand-held power tool 34a. For this purpose, the guide extensions 44a, 44a', 44a" project partially beyond the contact elements 22a, 22a', 22a" and, during a joining operation, engage in the recesses 38a, 38a', 38a", before the contact elements 22a, 22a', 22a" engage in the contact receiving regions 14a, 14a', 14a".

The contact elements 32a, 32a', 32a" of the coupling device 12a are arranged in an offset manner in relation to each other in a direction parallel to a direction of main extent 35a of the contact elements 32a, 32a', 32a". The direction of main extent 35a of the contact elements 32a, 32a', 32a" corresponds approximately to a direction of main extent of the hand-held power tool 34a. The corresponding contact elements 22a, 22a', 22a" of the additional module 16a are likewise arranged in an offset manner in relation to each other in a direction parallel to a direction of main extent of the contact elements 22a, 22a', 22a". A direction of main extent of the contact elements 22a, 22a', 22a" of the additional module 16a corresponds to the direction of main extent 35a of the contact elements 32a, 32a', 32a" of the coupling device 12a. In this case, an offset between the contact elements 22a, 22a', 22a" of the additional module 16a differs from an offset between the contact elements 32a, 32a', 32a" of the coupling device 12a.

Figure 7:
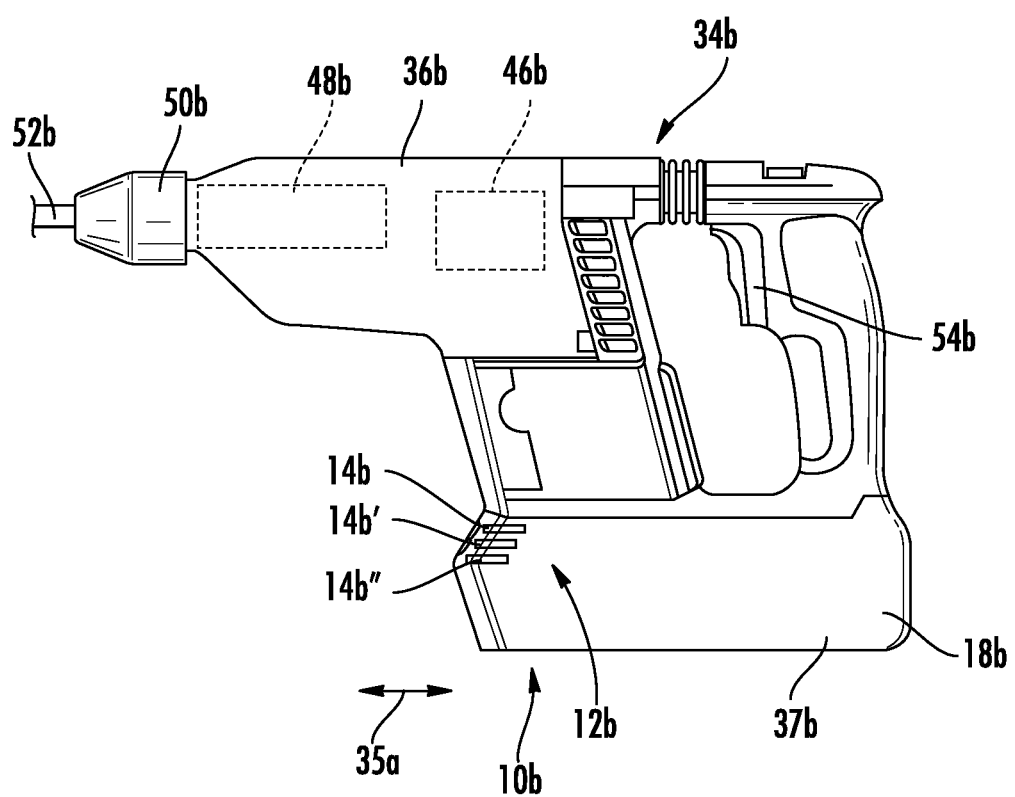

A further exemplary embodiment of the disclosure is shown in FIG. 7. The following descriptions and the drawing are limited substantially to the differences between the exemplary embodiments, and in principle reference may also be made to the drawings and/or to the description of the first exemplary embodiment, in particular of FIGS. 1 to 6, in respect of components having the same designation, in particular relating to components having the same references. To distinguish the exemplary embodiments, the letter a has been appended to the references of the exemplary embodiment in FIGS. 1 to 6. In the exemplary embodiment of FIG. 7, the letter a has been replaced by the letter b.

FIG. 7 shows a hand-held power tool 34b, having an energy supply unit 18b and having a hand-held power-tool device 10b. The energy supply unit 18b is realized as a battery device. The energy supply unit 18b is realized as a battery. The energy supply unit 18b additionally has a housing 37b.

The hand-held power-tool device 10b has a coupling device 12b. The coupling device 12b has a contact holder. The contact holder is arranged in the housing 37b of the energy supply unit 18b. The contact holder is fastened within the housing 37b of the energy supply unit 18b, in a manner that is not further visible.

In addition, the coupling device 12b has three contact receiving regions 14b, 14b', 14b". The housing 37b of the energy supply unit 18b has three recesses, which correspond to the contact receiving regions 14b, 14b', 14b", and via which the contact receiving regions 14b, 14b', 14b" are open outwardly.

What is claimed is:

1. A hand-held power-tool device, comprising:
   at least one coupling device having at least one contact receiving region, the at least one coupling device configured to couple an optional additional module to at least one energy supply unit, the at least one contact receiving region defining an opening that has (i) at least one receiving opening portion and (ii) at least one dirt removal opening portion,
   wherein the at least one receiving opening portion is configured to receive a corresponding contact element of the optional additional module and wherein the at least one dirt removal opening portion is configured to permit dirt to pass directly out of the contact receiving region when the optional additional module is in a coupled state with the at least one energy supply unit.

2. The hand-held power-tool device according to claim 1, wherein the at least one dirt removal opening portion is located, at least partially, in a sub-region of the at least one contact receiving region that differs from a sub-region in which the at least one receiving opening portion is located.

3. The hand-held power-tool device according to claim 1, wherein the at least one dirt removal opening portion constitutes an opening plane that extends at least approximately perpendicularly in relation to an opening plane of the at least one receiving opening portion.

4. The hand-held power-tool device according to claim 1, wherein the at least one dirt removal opening portion directly adjoins the at least one receiving opening portion.

5. The hand-held power-tool device according to claim 1, wherein the at least one coupling device has (i) at least one contact holder configured to delimit, at least partially, the at least one contact receiving region, (ii) at least one contact element configured to project, at least partially, into the at least one contact receiving region, and (iii) at least one latching element, via which the at least one contact element of the at least one coupling device is secured to the at least one contact holder.

6. The hand-held power-tool device according to claim 1, wherein:
   the at least one coupling device has at least one contact element configured to project, at least partially, into the at least one contact receiving region, and
   the at least one contact element of the at least one coupling device is configured as an electrical contact element.

7. The hand-held power-tool device according to claim 1, wherein the at least one coupling device has at least two contact elements configured to be connected to the at least one energy supply unit, the at least two contact elements each having a direction of main extent corresponding approximately to a direction in which the contact element is received by the receiving opening portion, the at least two contact elements arranged in an offset manner in relation to each other in a direction parallel to the direction of main extent of the at least two contact elements.

8. The hand-held power-tool device according to claim 1, wherein the at least one receiving opening portion receives the corresponding contact element of the optional additional module in a first direction and, in the coupled state, the at least one dirt removal opening portion permits dirt to pass directly out of the contact receiving region in a second direction oriented transversely to the first direction.

9. The hand-held power-tool device according to claim 1, wherein the at least one coupling device has a base body and a plurality of first walls that project out of the base body, and wherein at least one adjacent pair of the first walls at least partially defines the at least one contact region.

10. The hand-held power-tool device according to claim 9, wherein the contact element has a direction of main extent corresponding approximately to a direction in which the contact element is received by the receiving opening portion, and wherein the first walls are parallel to one another and extend in the direction of main extent of the contact element of the optional additional module.

11. The hand-held power-tool device according to claim 10, wherein the at least one coupling device has at least one second wall that projects from both the base body and at least one first wall of the at least one adjacent pair of the first walls, the at least one second wall extending transversely to the direction of main extent.

12. The hand-held power-tool device according to claim 11, wherein the at least one second wall is rounded off at an intersection of the at least one second wall and the at least one first wall.

13. The hand-held power-tool device according to claim 11, wherein the at least one second wall is rounded off at an intersection of the at least one second wall and the base body.

14. A hand-held power tool, comprising:
   a housing;
   at least one energy supply unit; and
   a hand-held power-tool device integrated with the housing, the hand-held power tool device including:
      at least one coupling device having at least one contact receiving region, the at least one coupling device configured to couple an optional additional module to the at least one energy supply unit, the at least one contact receiving region defining an opening that has (i) at least one receiving opening portion and (ii) at least one dirt removal opening portion,
      wherein the at least one receiving opening portion is configured to receive a corresponding contact element of the optional additional module and wherein the at least one dirt removal opening portion is configured to permit dirt to pass directly out of the contact receiving region when the optional additional module is in a coupled state with the at least one energy supply unit,
   wherein the housing defines at least one recess that corresponds to the at least one contact receiving region such that the at least one receiving opening portion and the at least one dirt removal opening portion open outwardly from the hand-held power tool.

15. The hand-held power tool according to claim 14, wherein:

the at least one coupling device has (i) at least one contact holder configured to delimit, at least partially, the at least one contact receiving region, (ii) at least one contact element configured to project, at least partially, into the at least one contact receiving region, and (iii) at least one latching element, via which the at least one contact element of the at least one coupling device is secured to the at least one contact holder, and a labyrinth is located in a transition region between the housing and at least one contact holder of the hand-held power-tool device.

16. A system, comprising:
at least one additional module; and
at least one hand-held power tool including
a hand-held power-tool device including at least one coupling device having at least one contact receiving region, the at least one coupling device configured to couple an optional additional module to at least one energy supply unit, the at least one contact receiving region defining an opening that has (i) at least one receiving opening portion and (ii) at least one dirt removal opening portion, and a housing having at least one recess, via which the at least one contact receiving region is open outwardly, wherein the at least one receiving opening portion is configured to receive a corresponding contact element of the optional additional module and wherein the at least one dirt removal opening portion is configured to permit dirt to pass directly out of the contact receiving region when the optional additional module is in a coupled state with the at least one energy supply unit.

17. The system according to claim 16, wherein the at least one additional module has at least one contact element and, parallel thereto, at least one guide extension, which is provided to pre-center the at least one contact element.

* * * * *